United States Patent [19]

Green

[11] Patent Number: 4,681,305
[45] Date of Patent: Jul. 21, 1987

[54] PORTABLE WORK DEVICE

[76] Inventor: Robert Green, 1222 W. Grand Ave., Chicago, Ill. 60622

[21] Appl. No.: 762,050

[22] Filed: Aug. 2, 1985

[51] Int. Cl.⁴ .............................................. B25B 1/02
[52] U.S. Cl. ..................................... 269/139; 269/88; 269/253; 269/901
[58] Field of Search ........... 269/139, 170, 253, 254 R, 269/69, 88, 901, 41, 166

[56] References Cited

U.S. PATENT DOCUMENTS

| 1,221,774 | 4/1917 | Taylor | 269/170 |
| 2,365,436 | 12/1944 | Saucier | 269/69 |
| 2,669,958 | 2/1954 | Swesny | 269/71 |
| 4,248,411 | 2/1981 | Wagster et al. | 269/139 |

Primary Examiner—Frederick R. Schmidt
Assistant Examiner—Judy J. Hartman
Attorney, Agent, or Firm—Wood, Dalton, Phillips, Mason & Rowe

[57] ABSTRACT

A vise assembly is provided for use in conjunction with a work device of the type having a working table and a base for supporting the table in an elevated, working position. The vise assembly comprises a pair of jaws selectively movable towards and away from each other along a guide bar to effect clamping about a workpiece. The jaws are attached adjustably to the work device so that the jaws can be repositioned to accommodate various workpiece configurations and hold workpieces in a desired orientation. Additional support is provided for workpieces by an adjustable work bar that is preferably pivotally attached to the work device. The work bar can be moved upwardly to supplement the support for the workpiece provided by the jaws and working table.

7 Claims, 12 Drawing Figures

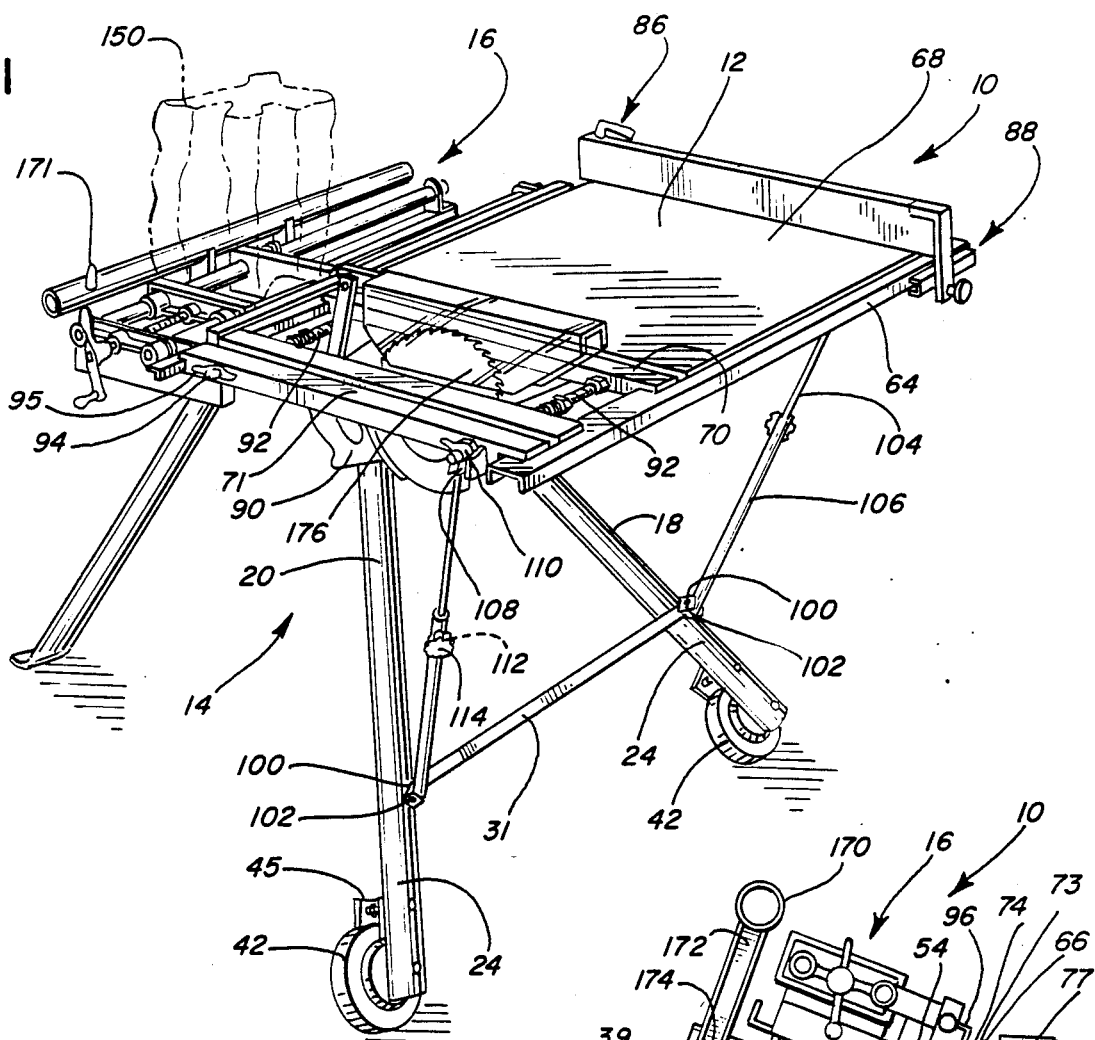
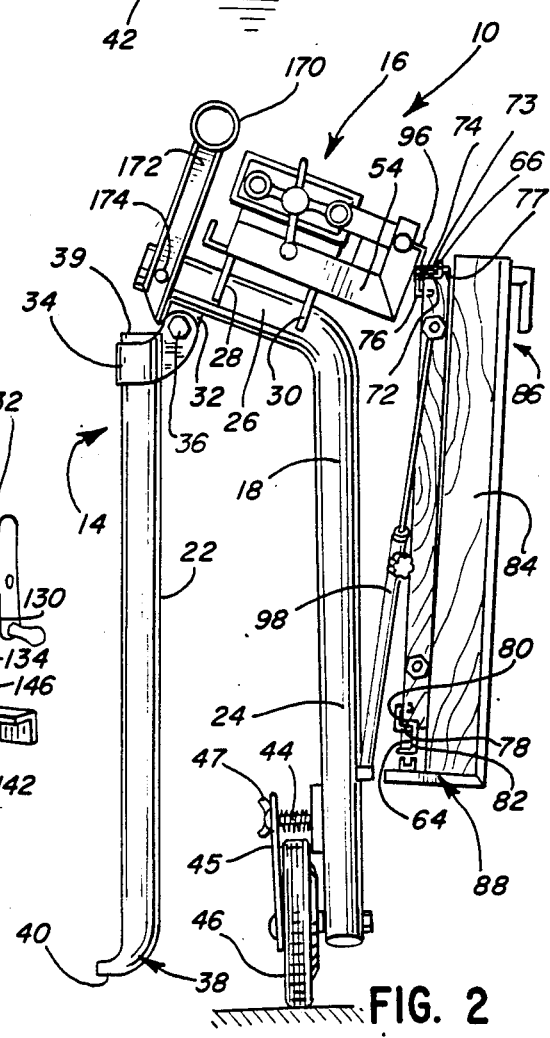
FIG. 1
FIG. 3
FIG. 2

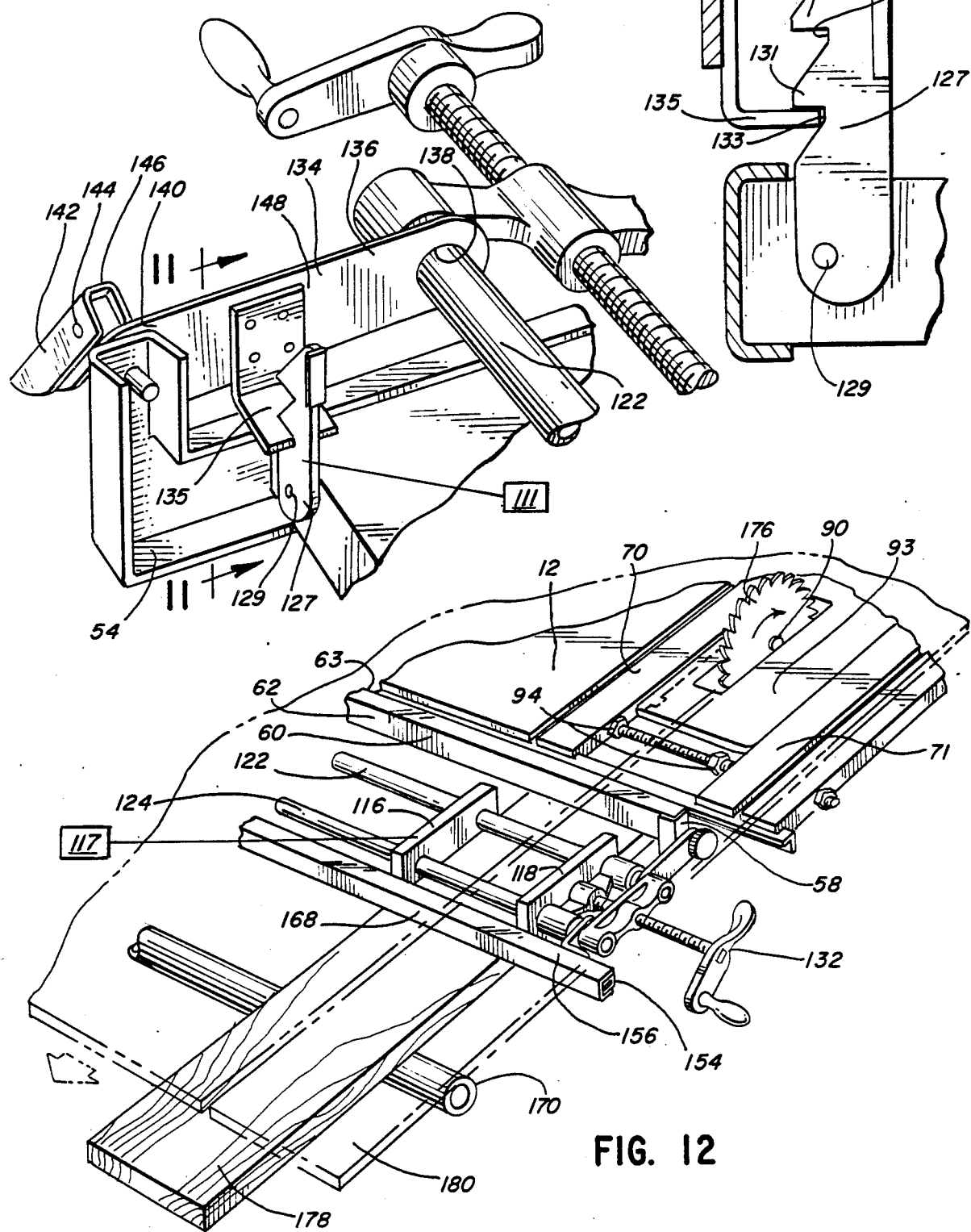

PORTABLE WORK DEVICE

BACKGROUND OF THE INVENTION

1. Field of the Invention

This invention relates to portable work devices such as those used on site in construction operations and, more particularly, to a vise assembly for use in conjunction with a table on the work device to facilitate workpiece handling and performance of desired work operations on the workpieces.

2. Background Art

On site construction operations present serious challenges to professional craftsman. A wide range of work operations must normally be performed ranging from cutting of large sheets to the precise, finish cutting of delicate moldings. Normally, at a permanent wood working facility, the numerous operations are performed with a variety of different tools. However, it is impractical to transport all the tools specifically designed for such specialized operations to a temporary site.

Tool manufacturers have designed various portable equipment specifically for on site operations. It is known, for example, to provide a portable miter box with a power circular saw to make precise, square and angled cuts on moldings and other narrow materials which the saw bed will accommodate.

For cross-cutting operations, portable radial arm saws can be employed. As with the miter box, the radial arm saw has a very limited function and will accommodate material of limited dimension, as dictated by the length of the arm.

One normally uses a table saw to produce accurate cuts on large sheets. However, the table size on a portable saw is severely limited. More than one individual may be required to support and maneuver a large sheet through the saw.

Further, it is often desirable to clamp workpieces in place on site to effect sculpturing, sanding, drilling, nailing, gluing, scraping, routing, or other operation requiring a firmly anchored workpiece. Portable work benches are currently manufactured with integral jaws to clamp workpieces. Generally, the jaws of conventional clamping structure are movable only along a line selectively towards and away from each other. Such benches are one-dimensional in function and have limited utility.

SUMMARY OF THE INVENTION

The present invention is specifically directed to overcoming the above-enumerated problems in a novel and simple manner.

According to the invention, a vise assembly is provided for use in conjunction with a work device of the type having a working table and a base for supporting the table in an elevated, working position. The vise assembly comprises a pair of jaws selectively movable towards and away from each other along a guide bar to effect clamping about a workpiece. In a preferred form of the vise assembly, the jaws are adjustable as a unit about a first pivot axis relative to a pair of arms. The arms themselves are in turn adjustable about a second axis so that multi-dimensional pivoting of the jaws can be accomplished, thereby enhancing the versatility of the vise assembly.

Additional support is provided for workpieces by an adjustable work bar that is preferably pivotally attached to the work device. The work bar can be moved upwardly into engagement with materials supported by the jaws and/or the table. The workpieces held by the vise assembly are firmly based and can be easily operated on by hand held tools, such as circular saws, hand saws, etc.

The invention also contemplates the provision of a cross-cut guide structure associated with the vise assembly. A stationary fence, attached to the vise assembly, pivotally carries an elongate, adjustable fence with a straight, flat surface for guiding a power or hand saw. The adjustable fence can be pivoted through a range of angles and fixed at a chosen angle. Long workpieces can be fixed cooperatively by the vise assembly, the work support bar and the table. The firmly held workpiece can then be accurately cross-cut utilizing the aforementioned fence arrangement. The cross-cutting capacity is substantially greater than conventional radial saws.

The invention also contemplates mounting of the table vise assembly upon a tripodal base so that the entire structure is firmly founded on uneven terrain as is normally contemplated in on site construction operations. All the operations carried out on the miter box, radial saw, chop saw, table saw and others can be performed accurately upon but a single structure according to the present invention. The construction of the work device makes it a valuable on-the-job tool particularly for the professional draftsman.

BRIEF DESCRIPTION OF THE DRAWINGS

FIG. 1 is a perspective view of a portable work device in its operating state and incorporating a vise assembly according to the present invention;

FIG. 2 is a side elevation view of the portable work device in in FIG. 1 in a collapsed state;

FIG. 3 is a fragmentary, perspective view of the vise assembly clamped about a workpiece;

FIG. 10 is an enlarged, fragmentary, perspective view of an adjustable lock for the vise assembly;

FIG. 11 is an end elevation view of the lock in FIG. 10; and

FIG. 12 is a fragmentary, perspective view of the work device with a workpiece attached to provide support for a large, flexible sheet.

DETAILED DESCRIPTION OF THE DRAWINGS

Figure 4:
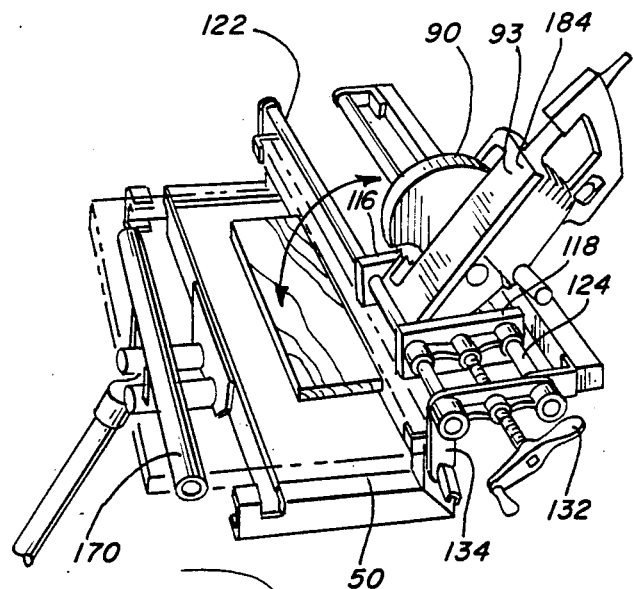
FIG. 4 is a fragmentary, perspective view of the vise assembly with a circular saw mounted for operation in a chop saw mode.

FIGS. 1 and 2 respectively show the work device at 10, according to the present invention, in its operating and collapsed states. The work device 10 comprises a primary table 12 carried by a tripodal base at 14. The invention resides in the provision of a vise assembly at 16 for use in conjunction with the table 12 on the work device 10 to support and/or hold workpieces to facilitate performance of desired operations on the workpieces.

The base 14 comprises interconnected, tubular front legs 18, 20 and rear leg 22. The front legs are identically L-shaped, and each have an integral vertical portion 24 and horizontal portion 26. The front and rear legs are interconnected through vise assembly attachment plates 28, 30 welded to the horizontal leg portions 26. The horizontal leg portions 26 are fixed in substantially parallel alignment and the vertical portions 24 of legs 18, 20 diverge laterally from top to bottom for stability. The connection of the legs 18, 20 is rigidified by a strap 31 which interconnects the midportions of the legs 18, 20.

Depending from the horizontal portions 26 of each of the legs 18, 20 is a tab 32 which provides a mount for the rear leg 22. A curved clamp 34 surrounds the upper region of the rear leg 22 and is attached for pivoting to the tabs 32 as by a bolt 36 and is thereby adjustable between the FIGS. 1 and 2 positions. A stop 37 (FIG. 3) abuts the upper edge 39 of the leg 22 with the operating state of FIG. 1 realized. The rear leg 22 is flattened and turned under at 38 to provide a curved bearing surface 40.

The tripodal construction is preferred for its ability to adapt to irregular terrain as can be anticipated in on site operations. The tubular leg construction affords substantial stability to the work device 10 and durability for heavy work operations. By simply folding the rear leg 22 towards the front legs 18, 20, the base can be compacted to the FIG. 2 configuration in which it is easily transportable and can be conveniently stored.

To facilitate maneuverability of the collapsed device 10 in FIG. 2, wheel assemblies 42 are provided on each of the front legs 18, 20. The wheels rotate about axes perpendicular to the plane of the vertical portions 24 of the legs 18, 20, so that there is no tendency of the base to roll towards its collapsed state in FIG. 2. To prevent any shifting laterally, the wheel assemblies 42 are provided with conventional braking mechanisms 44. A brake plate 45 is normally spring biased away from the wheel sidewall 46. A wing nut 47 allows hand tightening to overcome the spring bias and urge the plate 45 against the wheel sidewall 46 to prohibit rotation of the wheel.

The vise assembly 16 is carried atop the attachment plates 28, 30 and is clearly shown in FIGS. 1-3. Strap metal frame members 48 extend laterally of the device 10 and bound opposite edges of a solid wooden work table 50 associated with the vise assembly 16. Screws 49 can be extended successively through each of the attachment plates 28, 30, a frame member 48 and into the edges of the work table 50 to establish a unitary, rigid, flat work surface 52. At the lateral ends of the work table 50 are L-shaped brackets 54 formed from metal channel. The one leg 56 on each of the brackets 54 surrounds an end of the work table 50 and can be welded to the frame members 48 to captively bound the table 50. The other leg 58 extends upright and establishes a support for the primary table 12 which resides above the vise table 50. As seen in FIG. 12, between the legs 58 a main table support member 60 is affixed. One face 62 of the table support 60 serves as a square abutment for workpieces situated on the table 50. The opposite face 63 establishes a foundation to pivotally attach the primary table 12.

The primary work table 12 comprises a laterally extending, front, inverted channel member 64 and a rear angle member 66, which interconnect and hold in assembled relationship a main plate 68 and a plurality of parallel, elongate bars 70, 71. The main plate might alternatively comprise a plurality of laterally spaced plates supported to cooperatively define the flat work surface. The underside of the rear portion of the plate 68 and bars 70, 71 is undercut at 72 to accept the leg 74 of the angle member 66. U-shaped brackets 76 are bolted to bear on the underside of the table 12 and maintain the leg surface 77 facially against shoulders 73 defined by the undercuts 72.

The channel member 64 bears against undercut walls 78 at the front portion of the plate 68 and bars 70, 71, constituting generally the work table 12. Similar U-shaped brackets 80 maintain the web 82 of the channel 64 against the undercut 78. The channel and angle members cooperatively serve as guides for an adjustable ripping fence 84 that is of conventional design. Generally, clamping assemblies 86, 88 are provided at the rear and the front of the fence 84 respectively to fix the fence as desired relative to the table 12.

The table 12, according to the present invention, will accept any of a variety of hand tools which attach in an inverted position. In FIGS. 1 and 12, a conventional worm drive saw 90 is mounted to the table. It should be noted that this particular saw is only exemplary of a type saw that can be mounted on the device. To effect mounting of the saw, bar 71 is made laterally adjustable relative to bar 70 that is normally fixed. The bars 70,71 cooperatively capture the saw or other power tool in inverted position for operation using the table 12.

To allow adjustment of the bar 71, laterally extending threaded rods 92 extend through the bars 70, 71 and plate 68. Adjustment nuts 94 with enlarged heads 95 to facilitate hand adjustment are selectively controlled to adjust the bar spacing and to firmly capture the saw support plate 93. Lateral adjusting movement of the bar 71 is guided by the angle and channel members. To facilitate removal of the saw, the bar 71 may be biased away from bar 70 as by a spring (not shown).

The table 12 is attached pivotally to the support 60 by a plurality of hinges 96. The hinges allow the table 12 to swing freely between the FIG. 1 position and the FIG. 2 position, the latter wherein the table 12 abuts the front legs 18, 20. To maintain the table in the work position of FIG. 1, adjustable braces 98 are attached to each front leg 18, 20. The bottom of each brace 98 is surrounded by a U-shaped clip 100 affixed to each leg 18,20. A pin 102 passes through each leg of the clip and the brace to permit pivoting movement of the brace about the pin axis.

Each brace 98 has telescopingly mating male and female rods 104, 106 respectively. Each male rod has an end fitting 108 with a bore to accept the threaded rod 92 associated with the table 12. A bolt with an enlarged, knurled head 110, to facilitate its turning, extends through the end fitting 108 and fixes the end fitting to the threaded rod 92. With the table in its desired orientation, the combined length of rods 104, 106 can be fixed by tightening a bolt 112. The bolt 112 has an enlarged head 114 to facilitate manipulation thereof by hand. To effect collapse of the work device, the end fittings 108 are loosened and slid off the free ends of the rod 92 and the braces folded downwardly before collapsing the table 12. Alternatively, a fixed length rod can be used and has a length to support the table in a horizontal position.

The invention relates primarily to the vise assembly 16 associated with the work table 50 and detailed clearly in FIGS. 2–12. The vise assembly comprises a pair of jaws 116, 118 with flat, facing, clamping surfaces 121, 123 between which workpieces can be captured. The jaws are cast metal and each have spaced bores 120 receiving elongate guide bars 122, 124 along the length of which the jaws are guidingly translated. The one jaw 116 has structure, shown schematically at 117 in FIG. 12, for fixing its position selectively along the length of the guide bars 122, 124. The structure 117 consists of a plurality of leaf springs 125, each of which has integral end rings closely surrounding the bars 122, 124. The springs are normally biased so that the ring axes are not coincident with the bar axes. The rings and bars thereby bind causing the jaw 116 to be maintained stationary relative to the bars. By pressing against the leaf spring, the rings can be shifted into axial alignment with the guide bars to allow sliding adjustment of the rings and jaw 116 relative to the bars.

The jaw 118 loosely, rotatably receives the end of an adjusting rod 128 which mates threadably in a bore associated with an end fitting 130 attached fixedly to the ends of the bars 122, 124. By operating a handle 132 associated with the rod 128, the jaw 118 can be translated relative to the bars 122, 124 to selectively either close or enlarge the spacing between the jaw surfaces 121, 123. The jaw 116 can be adjusted, depending upon the workpiece size to take advantage of the full range of adjustment of rod 128.

The guide bar 122 is mounted for pivoting movement relative to the table 50 by spaced arms 134. The one end 136 of each arm 134 has a bore 138 to accept the bar 122. The opposite end 140 is pivotally secured to the upright leg 58 of the bracket 54. A cam latch 142 is threadably connected to a bolt (not shown) associated with the bracket 54. Rotation of the latch 142 in one direction tightens the associated arm 134 against the bracket 54. Quick fixing and release of each arm is accomplished by pivoting each of the latches 142 about its mounting pin 144. To fix the arms, the cam edges 146 are brought to bear directly on the arm 134 to thereby establish tight, facial abutment between the arm faces 148 and bracket 54.

Upward pivoting of arms 134 can be consistently limited to predetermined positions, and in the described embodiment to two positions, by incorporating a saw-toothed pivoting latch 127 as shown in FIGS. 3, 10 and 11 at each side of the device. Each latch 127 is pivoted about a lengthwise axis 129 for movement in a laterally extending vertical plane and is biased laterally outwardly towards an engaged position shown in FIGS. 3, 10 and 11 by a conventional mechanism shown schematically at 111 in FIG. 10. Each latch has teeth 131 defining notches 133 to accept the leg 135 of an L-shaped plate 137 attached to the brackets 54 with the arms in desired positions.

With the described arrangement, pivoting of the bars 122, 124 and jaws 116, 118 as a unit can occur about the arm ends 136. This movement, in addition to pivoting movement of the arms 134 relative to the brackets 54 allows placement of the jaws 116, 118 in any of a variety of positions to allow clamping about workpieces of different configuration and size and situation of the workpiece in a desired orientation. One exemplary use for the clamping assembly is demonstrated in FIGS. 1 and 3, wherein a rectangular piece of stock at 150 is situated upon the vise table 50. The bars 122, 124 are positioned so that the workpiece 150 abuts the rearwardly facing surfaces of the bars 122, 124. The jaws are drawn tightly against the workpiece and the latches 142 locked so that the workpiece is firmly held relative to the table 50. With the workpiece 150 so positioned, any number of operations can be performed, such as, for example, sculpturing, routing or sanding.

Figure 7:
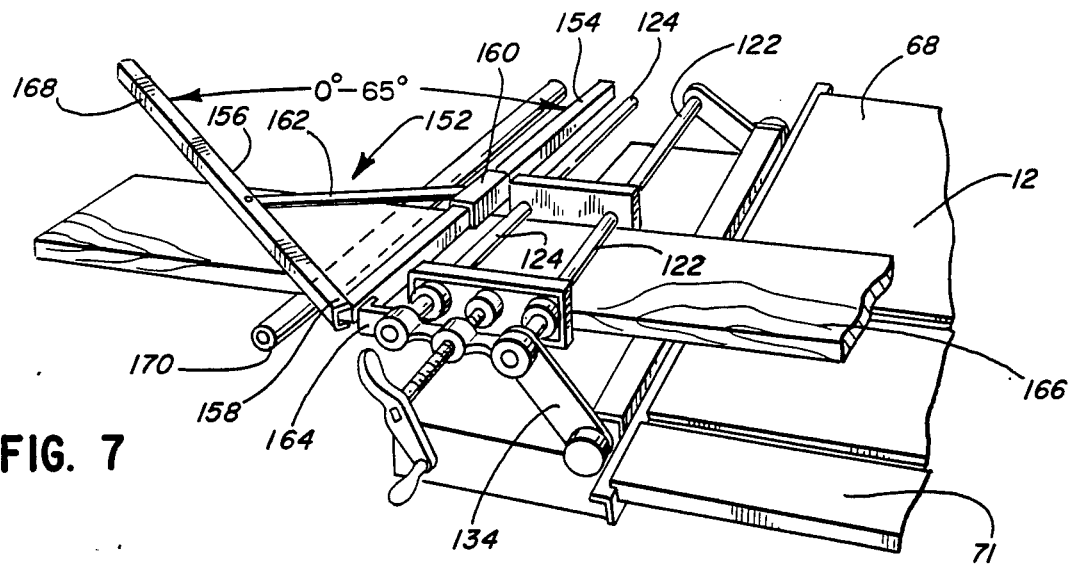
FIG. 7 is a fragmentary, perspective view of the vice assembly with a workpiece in position as in FIG. 6 and the cross-out guide structure adjusted for other than a square cross-cut.

An additional feature of the invention is demonstrated in FIG. 7. A cross-cut guide structure is shown at 152 attached to the device assembly. The cross cut guide structure 152 comprises a stationary fence 154 and an adjustable fence 156 pivotally connected at its end 158, as by a pin, relative to the fence 154. A slider 160 is translatable lengthwise along fence 154. A link 162 is pivotally connected at its opposite ends to the fence 156 and slider 160. The slider 160 and link 162 guide pivoting movement of the fence 156 relative to the fence 154. The slider has a locking bolt (not shown) which can be tightened against the fence 154 to lock in a desired angle $\theta$ between the fences 154, 156. Apertures or indentations might be provided on the fence 154 to accept the locking bolt with the guide structure 152 set at frequently used angles, i.e. 45° angles. Consistent angles can therefore be cut. The cross-cut guide structure 152 is mounted to the vise assembly by a pair of straps 164 affixed to the fence 154 and attached pivotally to the bar 124.

Figure 6:
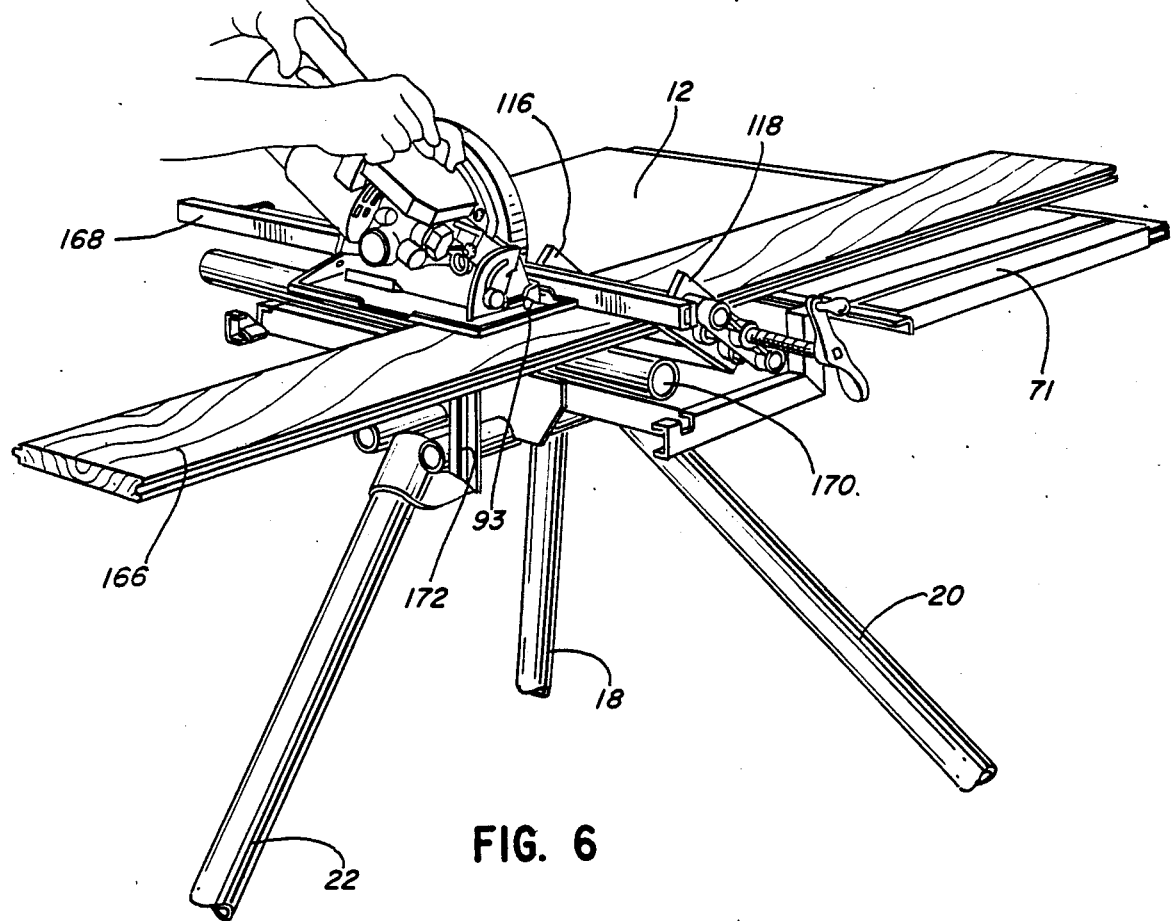
FIG. 6 is a perspective view of the work device with a workpiece clamped thereto demonstrating the performance of a cross-cut operation using cross-cut guide structure according to the present invention.

To operate the cross-cut guide structure 152, as shown in FIGS. 6 and 7, a board 166 is directed between the jaws 116, 118 and held clampingly therebetween and beneath the bars 122, 124. The cross-cut guide structure 152 can be pivoted to bear upon the upper surface of the board 166, the potential width of which is limited only by the spacing between the arms 134. With the fences 154, 156 closely abutted against each other as in FIG. 12, the rear surface 168 of the fence 156 serves as a guide edge for the plate 93 of a hand operated power saw such as the worm drive saw 90 depicted in FIG. 6. By pivoting the fence 156 away from the fence 154 about end 158, a range of angles, preferably between 0° and 65° can be chosen between the fence 154 and the face 168 associated with the fence 156. By locking the slider as previously described, desired angles can be fixed and the surface 168 used in the same manner to guide the saw plate across the board 166 in all cross-cutting operations. The fence 154 may be graduated to identify the angle defined between the fences 154, 156 based upon the position of the slider 160 on the fence 154.

In another aspect of the invention, a work bar 170 as shown in FIGS. 2, 4–9 and 12 is provided and extends laterally relative to the table 12. An optional pin 171 (FIG. 1) can be provided to assist location of workpieces squarely in the vise assembly 16. However, the ripping fence 84 generally suffices as a work guide. The work bar has a pair of parallel brackets 172 directed at right angles to its length, which cooperatively surround the horizontal portions 26 of the front legs 18, 20 and are secured for pivoting relative movement thereto as by a bolt 174 (FIG. 2). The work bar 170 serves as a support rearwardly of the vise table 50 for long workpieces and is particularly adaptable to the operation shown in FIG. 12.

Normally, cutting of light sheet material presents a problem for the saw operator. As the sheet is directed rearwardly off the table as shown in FIG. 12, it normally tends to deflect downwardly and bows so that the sheet pulls away from the saw blade 176. To avoid this, it is possible with the invention to provide a support board 178 or the like held clampingly against the vise table 50 in cantilever style fashion. The board can be additionally supported by the bar 170 which can be pivoted upwardly to meet the underside of the support board 178. With the board 178 so positioned, it provides a firm support for the sheet 180 as the sheet 180 progresses beyond the end of the table 12.

It is also possible to use the work bar 170 to support a workpiece in conjunction with the table and vise assembly as shown in FIGS. 6-9. In FIG. 6, the board 166 is directed between the clamp bars 122, 124, is directly supported by the table 12 and bar 170 and clamped between jaws 116, 118. Cross-cutting is guided by the fence face 168 in the same manner as previously described.

Figure 8:
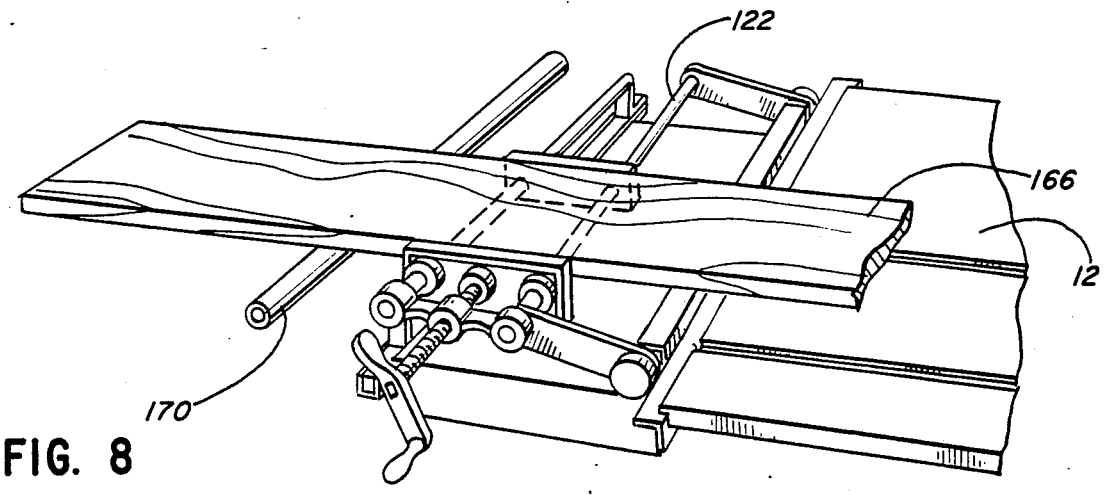
FIG. 8 is a fragmentary, perspective view of the vise assembly adjusted to support a flat board at the height of the associated work table.
Figure 9:
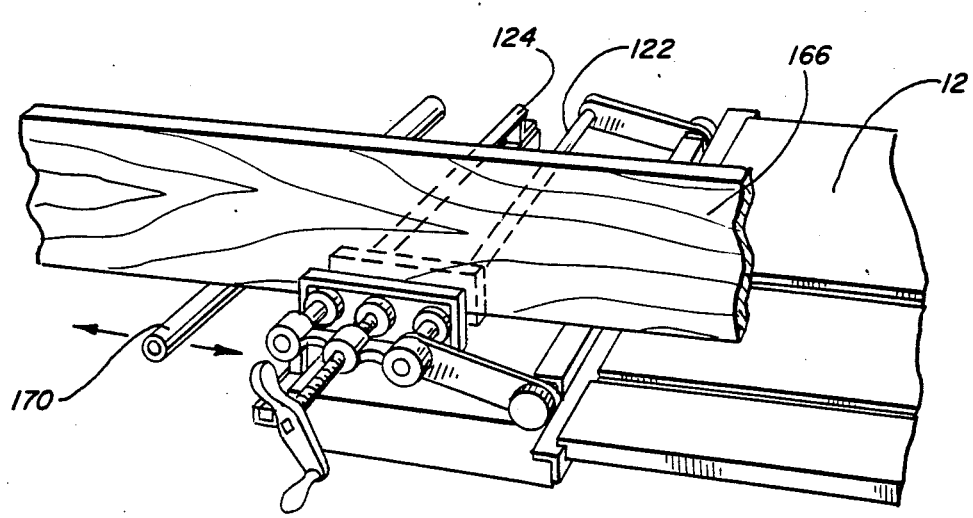
FIG. 9 is a fragmentary, perspective view of the vise assembly adjusted as in FIG. 8 with a board supported on its edge in the vise.

Alternatively, the board can be supported cooperatively by the upper surfaces of bars 122, 124 and the table 12 in either a flat position (FIG. 8) or on edge (FIG. 9). The board in each of FIGS. 8 and 9 is supported so that the upwardly facing surface of the board 166 is unobstructed for operation thereon by various tools.

Figure 5:
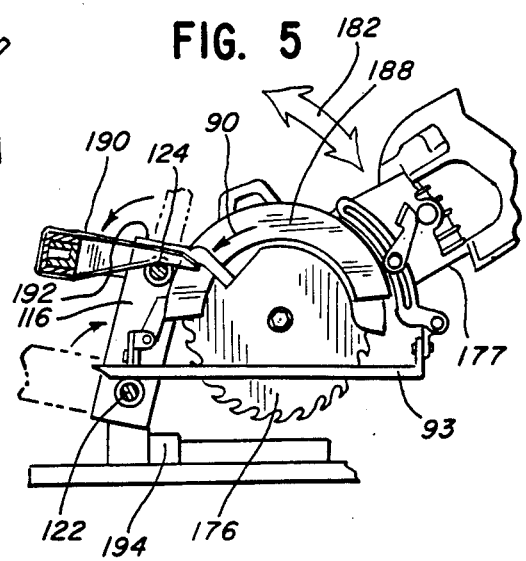
FIG. 5 is a side elevation view of the vise assembly with the saw mounted as in FIG. 4 and fixed for planing and/or mold forming operations.

A further use of the vise assembly is demonstrated in FIGS. 4 and 5, wherein the saw 90 is mounted so that it can be used in conjunction with the vise assembly as a chop saw. To accomplish this end, the saw plate 93 is captured between the jaws 116, 118 with the flat bottom surface 184 of the plate 93 bearing upon the guide bar 124. With the arms 134 locked, the saw 90 and the bars 122, 124 can pivot as a unit relative to the arms, towards and away from the table 50 as shown by the double-ended arrow 182. The saw 90 can be pivoted towards and away from the table to simulate the operation of a conventional chop saw. The work bar 170 can be adjusted to cooperate with the underside 177 of the saw housing to adjust the depth of cut.

To prevent obstruction by the saw guard 188 during chop sawing, an endless elastic member 190 can be disposed about the fences 152, 154 and a manual operating tab 192 associated with the guard 188. The guard will be maintained in the FIG. 5 position by the aforementioned arrangement so that the guard will not interfere as the blade is lowered onto a workpiece.

It should be noted that the described work operations are only exemplary of those that might potentially be performed utilizing the invention. For example, with the saw in the chop mode of FIGS. 4 and 5, the height of the saw can be fixed by pivoting the support bar 170 up to meet the saw housing as shown in FIG. 5 so that the saw can be used as a power plane. Individual workpieces can be introduced beneath the blade and directed parallel to the axis of rotation of the blade to effect the planing operation. Concave moldings can be shaped by advancing strips under the saw in similar fashion utilizing the blade curvature. A spacer block 194 can be placed on the table to provide a guide for the planing and shaping operations. The block 194 can be clamped directly to the table.

It should be understood that the foregoing detailed description was made for purposes of demonstrating the structure and operation of the invention with no unnecessary limitations to be understood therefrom.

I claim:

1. A vise assembly for use with a portable work device of the type having a table with a substantially planar, horizontally disposed primary work surface and a base for supporting the table in an elevated, working position, said vise assembly comprising:

a secondary work table with a secondary, upwardly facing surface for supporting a workpiece;

first and second jaw members;

means mounting the jaw members including an elongagte guide bar along the length of which each of the jaw members is adjustably adapted for translatory movement towards and away from each other in a first direction so that a range of workpiece size can be held firmly, captively between the jaw members;

the guide bar being connected to arm means pivotally mounting the guide bar and jaw members to the secondary table so that the guide bar and jaw members are pivotable together relative to the secondary work surface about a first axis extending substantially in said first direction;

means for selectively fixing the arm means relative to the secondary work table; and means for pivotally mounting the jaw members to the arm means for pivoting movement of the jaw members together about a second axis that is spaced from and substantially parallel to the first axis, whereby the jaw members can be reoriented and moved vertically relative to the secondary work surface with the secondary work surface in a horizontal situation and used to selectively hold a tool and workpiece in desired relationship to said secondary work surface to facilitate the preformance of work operations in conjunction with the primary work surface.

2. The vise assembly according to claim 1 including a work support bar having a work engagine surface and means for attaching the work support bar adjustably to the secondary table for relative vertical movement of the work engaging surface so that the work support bar can be used in conjunction with the secondary work surface and jaws to support a workpiece.

3. The vise assembly according to claim 1 wherein means are provided to engage said arm means and limit pivoting of the arm means relative to the secondary work table.

4. A vise assembly for use with a work device of the type having a table with a substantially planar, horizontally disposed primary work surface and a base for supporting the table in an elevated, working position, said vise assembly comprising:

a secondary work table with a secondary upwardly facing surface for supporting a workpiece; first and second jaw member;

each jaw member having spaced first and second bores which slidingly accept first and second parallel elongate guide bars, respectively means mounting the jaw members for movement adjustably along the length of the guide bars selectively towards and away from each other so that a range of workpiece sizes can be held firmly, captively between the jaw members;

first and second arms, each having first and second ends;

means attaching said first arm ends to the secondary work table for pivoting movement about an axis substantially parallel to the length of the guide bars; and means attaching the first guide bar to said second arm ends for pivoting of said guide bars and jaws together about a second axis along the length of the first guide bar, whereby said jaws can be adjusted relative to a workpiece on said secondary work surface by selectively pivoting said arms relative to the secondary work table and said guide bars relative to the arm.

5. The vise assembly according to claim 4 including a work support bar and means for attaching the bar pivotally to the secondary work table so that the vertical location of the work support bar can be changed and so that the work support bar can be repositioned to bear against a workpiece and provide support therefor in conjuction with the jaws.

6. The vise assembly according to claim 4 wherein means are provided on the secondary work table to engage one of said arms and limit upward pivoting of said one arm relative to the secondary work table.

7. The vise assembly according to claim 4 wherein means are provided to selectively fix the position of the arm means relative to the secondary work table.

* * * * *